Patented July 20, 1954

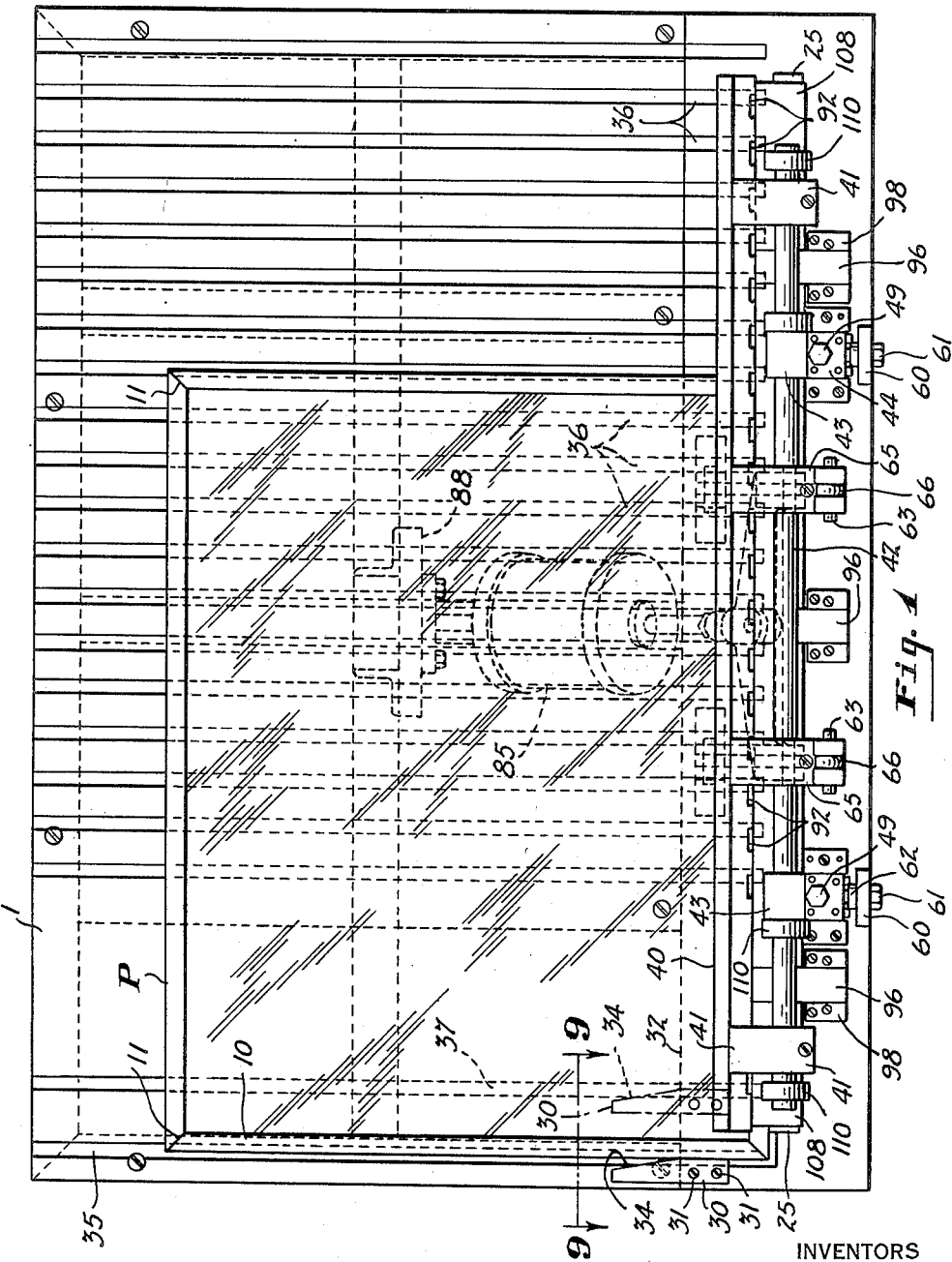

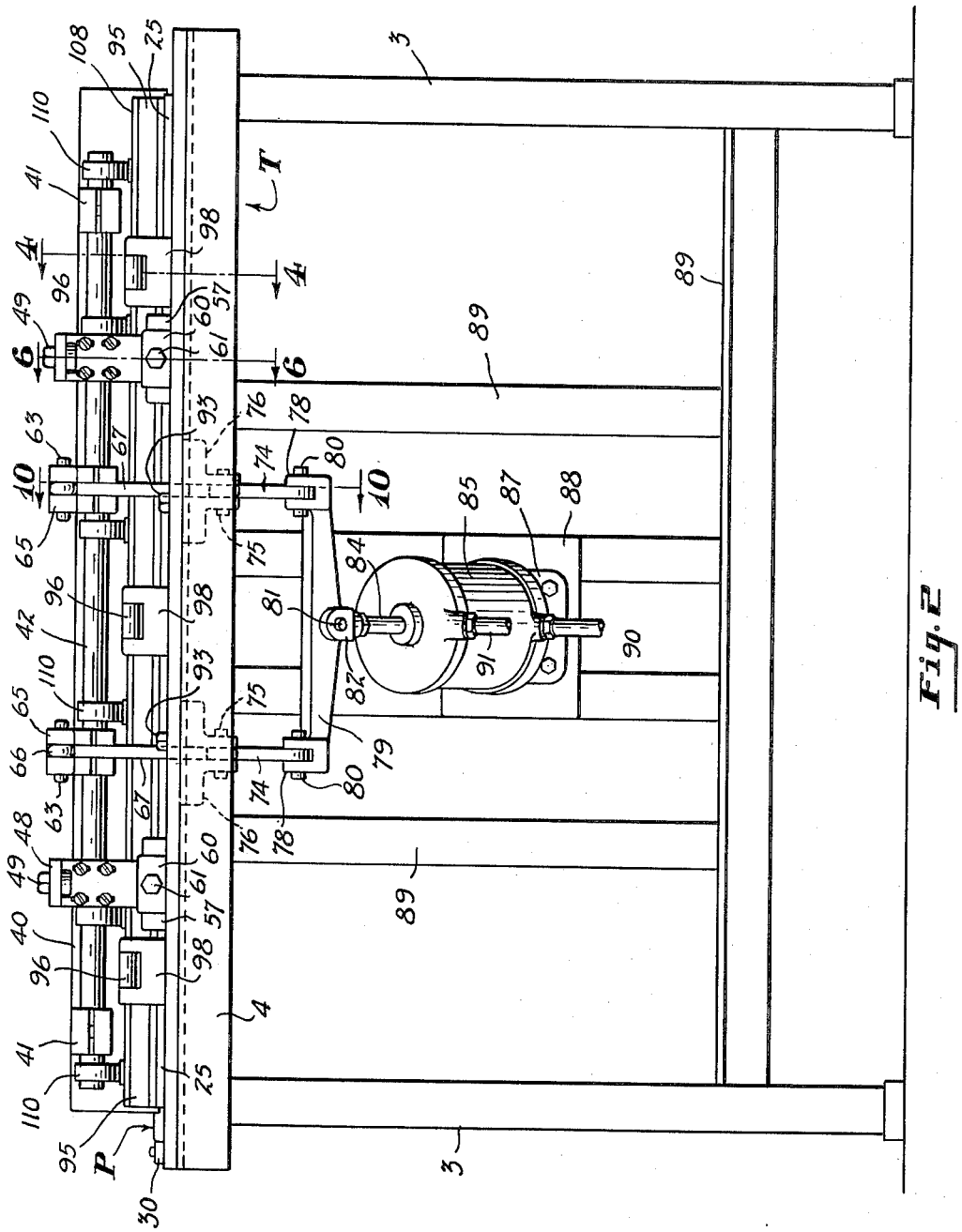

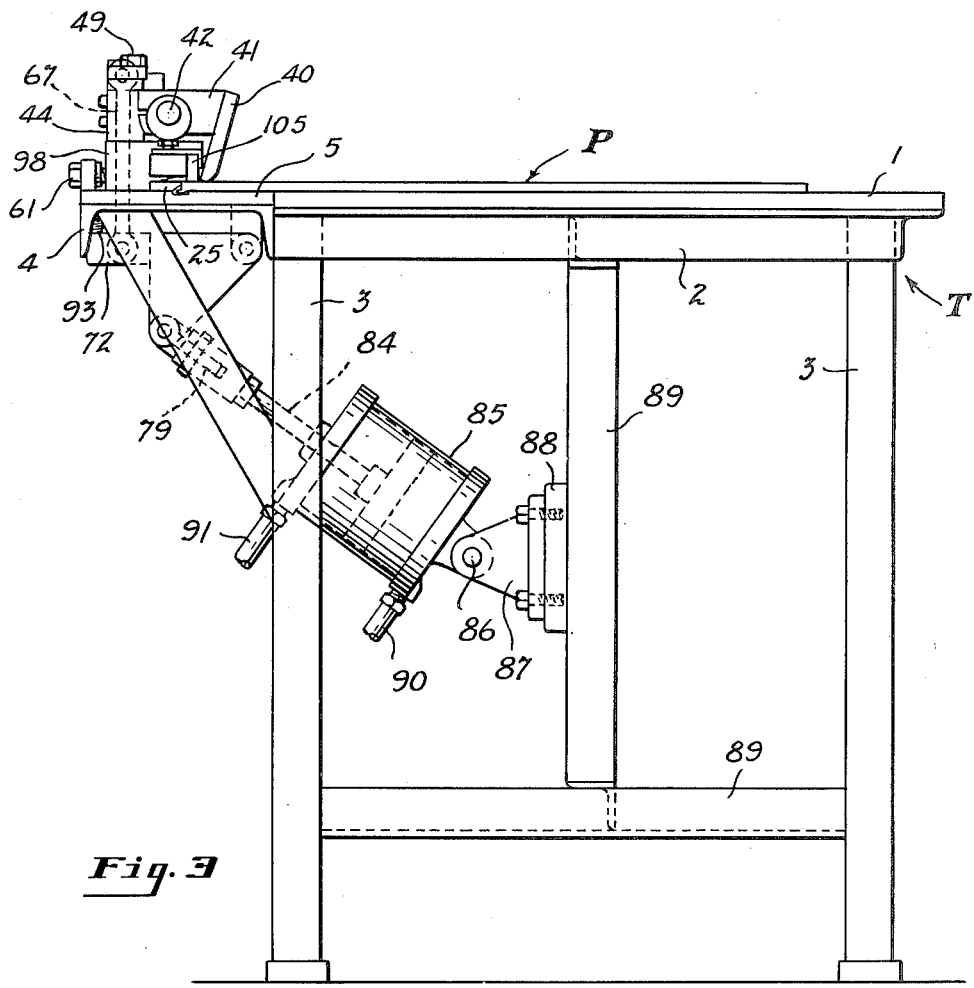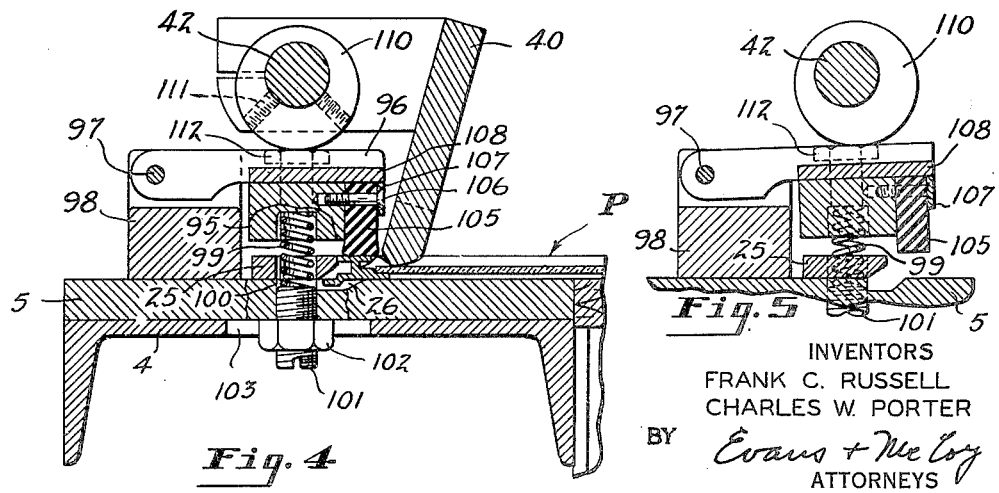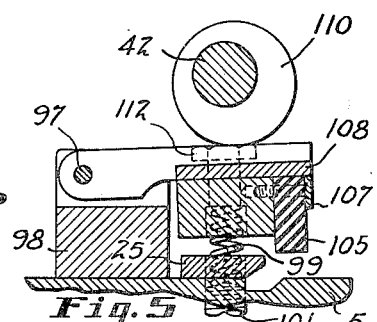

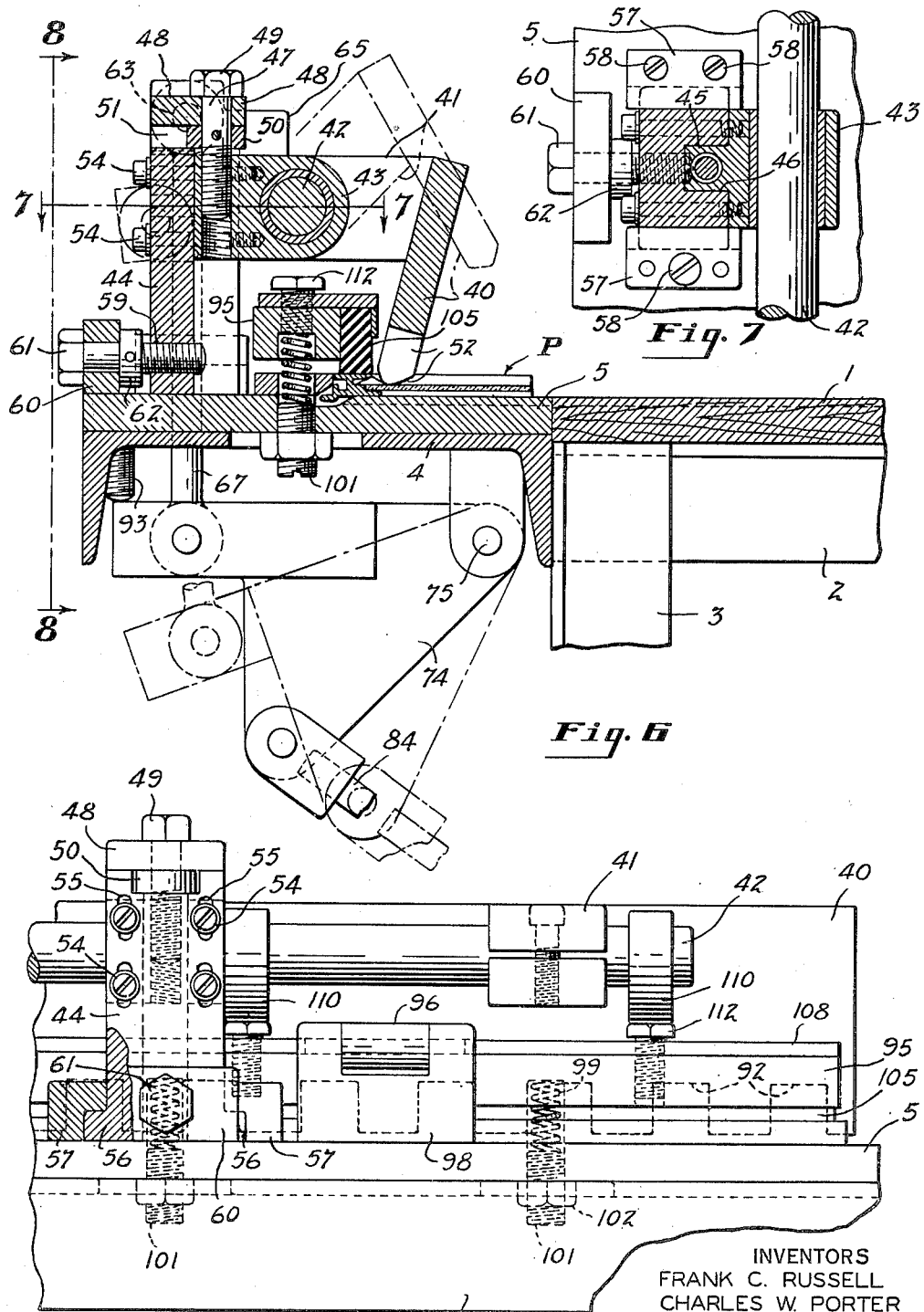

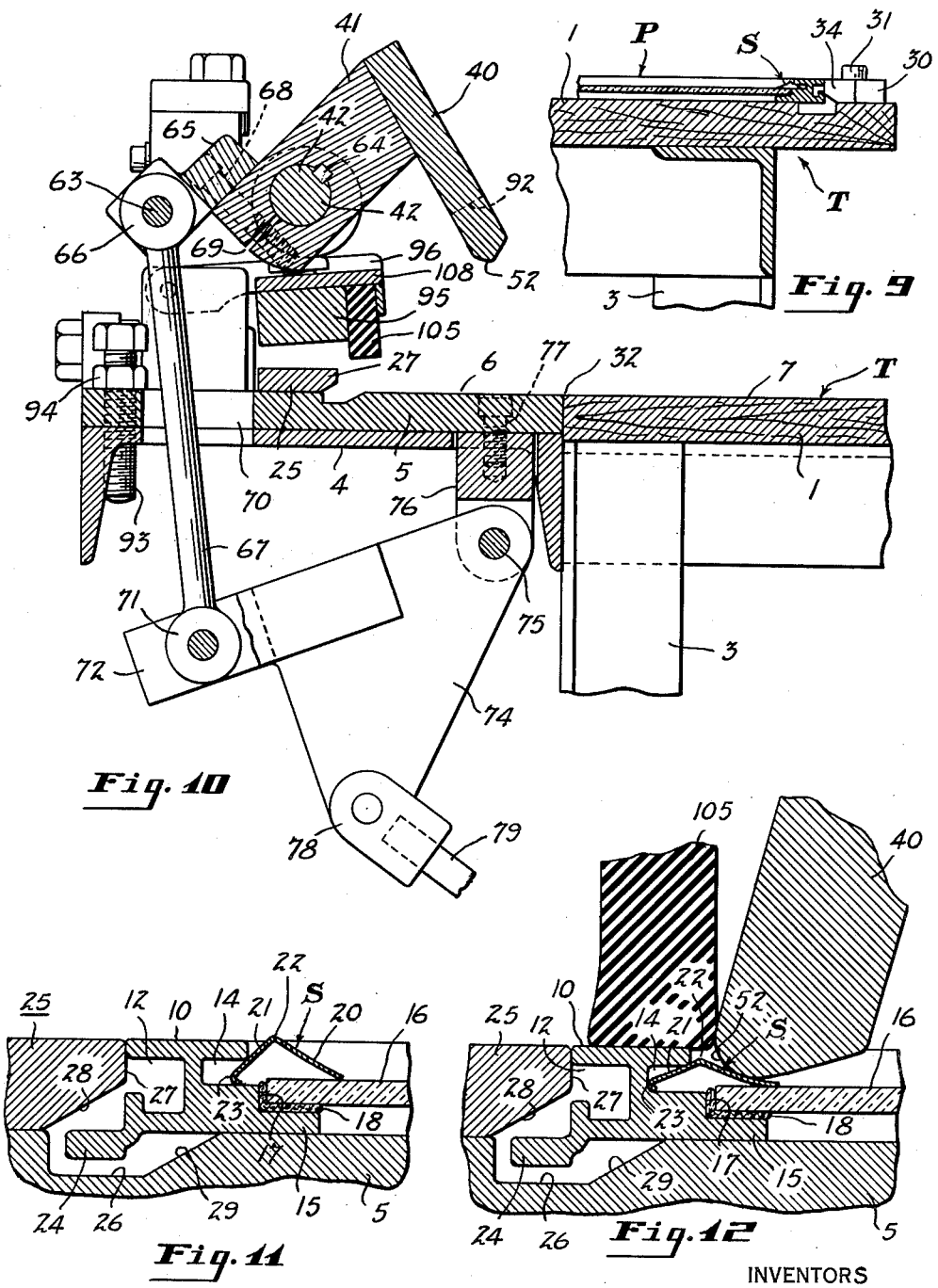

2,683,925

UNITED STATES PATENT OFFICE 2,683,925

APPARATUS FOR SETTING SPLINES

Frank C. Russell and Charles W. Porter, Cleveland, Ohio, assignors to The F. C. Russell Company, Cleveland, Ohio, a corporation of Ohio Application August 6, 1948, Serial No. 42,886

4 Claims. (Cl. 29—235)

This invention relates to a new and improved apparatus for placing or setting splines. More particularly the invention relates to a spline setting apparatus for quickly, uniformly and accurately inserting the entire length of a spline or similar retaining element in the recess provided therefor in an article such as a window frame.

In the manufacture of framed panels such as windows and screens, improved speed and economy are obtained by the use of spline elements for holding the glass, screen, or other panel material in place in the frame. Such splines are made of various materials, thin sheet metal such as beryllium copper and stainless steel being satisfactory. Although spring metal splines can be manually assembled in the grooves provided therefor in window frames, the use of the present machine for such purpose greatly increases the production rate of frame assembly and results in a more uniform product with less damage to and waste of material and with minimum danger to the operator by reason of tool slippage, glass breakage or otherwise. The use of such machine permits the assembly of splines in grooved and rabbeted frame members pursuant to a predetermined production schedule and method, the steps of which can be positively and accurately controlled much better than by manual assembly.

It is one of the principal purposes and objects of the present invention to provide an apparatus for assembling splines in grooved frame members such that pressure is applied uniformly and simultaneously along the length of the spline and acts not only to move the spline uniformly into the groove along the entire length of the latter but also to compress the spline against a panel supported in the frame to hold the panel in place during the assembly operation. The invention thus involves, among other features, supporting and holding a rabbeted frame member, preferably horizontally, to resist movement of the frame in a direction parallel to the direction of movement of the spline during the inserting operation and also in a direction normal to the spline movement.

Still further objects and advantages of the invention relate to certain details of construction and arrangements of parts, all of which will become apparent as the description proceeds. This description is made in connection with the accompanying drawings forming a part of the specification. Like parts throughout the several views of the drawings are indicated by the same letters and numerals of reference.

In the drawings:

Figure 1 is a top or plan view of a spline setting table incorporating the apparatus of the present invention, showing the frame and glass of a window panel supported thereon in spline setting position;

Fig. 2 is an elevational view of the spline setting table or apparatus of Fig. 1;

Fig. 3 is a side elevational view of the apparatus showing the spline setting mechanism and the window panel at the conclusion of a spline setting operation;

Fig. 4 is a fragmentary sectional detail, with parts broken away and removed, taken substantially on the line indicated at 4—4 of Fig. 2 and enlarged with respect to that figure, this view also showing the apparatus and the panel frame supported thereby at the conclusion of a spline setting operation;

Fig. 5 is a fragmentary sectional detail similar to Fig. 4 showing the clamp mechanism in open or retracted position for receiving a frame member to be splined;

Fig. 6 is a fragmentary sectional detail, with parts broken away and removed, taken substantially on the line indicated at 6—6 of Fig. 2 and enlarged with respect to that figure, this figure, like Fig. 4, showing the apparatus and a panel frame supported thereby at the conclusion of a spline setting operation;

Fig. 7 is a horizontal sectional detail, with parts broken away and removed, taken substantially along the line indicated at 7—7 of Fig. 6;

Fig. 8 is a fragmentary elevational view, partly in section and with parts broken away and removed, taken substantially along the line indicated at 8—8 of Fig. 6;

Fig. 9 is a fragmentary sectional detail, with parts broken away and removed, taken substantially on the line 9—9 of Fig. 1 and enlarged with respect to that figure;

Fig. 10 is a fragmentary sectional detail with parts broken away and removed, this view corresponding to Fig. 6 but showing the apparatus in initial or starting position prior to receiving a panel frame member therein;

Fig. 11 is an enlarged sectional detail through the table and stop showing a frame member, glass panel, and resilient sheet metal spline, in position for the spline setting operation; and Fig. 12 is a sectional detail similar to Fig. 11 showing the parts at the conclusion of the spline setting operation.

The apparatus of the present invention comprises work table T which has a horizontal top 1 supported on a frame of cross members 2 and corner legs 3. The table cross member, legs and other frame parts are formed of rolled steel sections and the top 1 may be of plywood or similar material. Along one side of the table is a horizontally disposed steel channel member 4 attached as by welding to the upper ends of two of the table legs 3 and arranged with the channel facing downwardly. An iron or steel plate 5 is mounted on the channel 4 and has an upper face 6 flush with and disposed in the same horizontal plane as upper face 7 of the plywood table top 1. The metal plate 5 thus extends as a continuation of the work surface of the table top 1 and provides a hard wear resistant surface for supporting the panel frame during the spline setting operation.

In certain of the figures a panel P is shown in place in or on the apparatus. The panel illustrated is representative of various types and forms of conventional construction. The metal frames of such panels are formed in various ways as by extruding, rolling and bending, the illustrated panel having frame members 10 of extruded light metal such as aluminum. At the corners of the panel the frame members 10 are mitered as indicated at 11 and suitably joined together. Each frame member 10 is of generally rectangular cross section and is recessed along its outer edge to provide a cavity 12 that later receives a weather seal material such as felt or rubber.

The inner edge of the frame member opposite the cavity 12 is formed with a relatively deep groove or channel recess 14 to receive strip spline S formed of resilient relatively thin sheet metal such as stainless steel or beryllium copper. The edge of the panel frame member 10 having the spline recess 14 is also rabbeted or otherwise formed along one edge with an integral flange or stop 15 against which is disposed glass panel 16. The retaining flange is spaced from the spline recess 14 providing a shoulder 17 against which the edge of the glass panel 16 is abutted. A sealing and cushioning strip 18 such as fabric material impregnated with a bituminous emulsion is interposed between the edges of the glass 16 and the frame members 10 of the panel to cushion the glass and to serve as a weather seal. The splines S are each of angle section or transversely bowed or curved having long and short flange portions 20 and 21 joined along a bend line 22. The edge of the short flange 21 is rolled or bent under, providing a bead 23 which facilitates the sliding of the flange into the groove 14 during assembly.

One or more of the frame members 10 may be formed with an offset flange 24 which is provided for the purpose of effecting an overlapping seal when a pair of panels are assembled together as in a storm window.

The panel P is located in predetermined position on the work surface 6 of the plate 5 by metal stop members. Longitudinal stop 25 is secured to the plate as by machine screws having their heads recessed in the upper surface of the stop. A longitudinal relief groove or slot 26 is formed along the length of the plate 5 adjacent and under abutment edge 27 of the stop 25 to accommodate the offset flange 24 of the frame member 10. The stop 25 is also undercut or chamfered at 28 providing clearance for the frame flange 24 in positioning the frame against the stop. One side of the plate relief 26 is also formed with an inclined face 29 over which the offset flange 24 of the frame member 10 moves in positioning the frame against the stop 25 and in removing the frame after splining. Inclined surface 29 has the effect of gradually lowering or raising the frame as the flange 24 moves into or out of the groove 26.

The lateral position of the panel P on the work plate 5 and table top 1 is determined by a stop 30 (Figs. 1, 2 and 9) which is secured to the plate 5 by recessed head machine screws 31. The stop 30 extends across the abutment line 32 between the table top 1 and the plate 5. This extension portion of the stop has inclined side face 34 which serves as a guide for engaging and directing the panel P into position on the work supporting surfaces 6 and 7 of the machine.

To accommodate the offset flanges 24 of the frame members 10 when the frame members having such flanges are disposed against the stop 30 a groove 35 is formed in table top 1 and work plate 5. This groove provides a clearance between the offset flanges 24 of the frames and the supporting table so that the frame members 10 are supported directly on the surfaces 6 and 7 of the work plate and table top.

At spaced intervals along the length of the table top a plurality of spaced grooves or channels 36 are formed in parallel relation to one another and to the groove 35. These parallel grooves accommodate the offset frame flanges 24 when the frames are turned to different positions on the work table in placing the splines S in the various frame members. By providing a multiplicity of the grooves 36 different panel sizes can be accommodated on the table, the distance between the stop 30 and the various grooves corresponding to the different sizes of panels to be splined. Shifting the stop 30 to the position indicated by the broken lines in Fig. 1 adjacent a supplemental groove 37 which parallels the groove 35 adjusts the apparatus to accommodate another series of panel sizes, the spacing between the grooves 35 and 37 differing from the spacing between the various grooves 36. All of the grooves 35, 36 and 37 are continuous in both the plywood table top 1 and the metal work plate 5 and intersect the longitudinal groove 26.

A movable pressure bar or elongated pressure member 40 for setting the splines S is supported for lateral swinging movement by arms 41 secured to a rod or shaft 42 mounted to turn in journals formed in or supported by adjustable heads 43. The pressure bar 40 may be a steel plate to which the arms 41, also steel plates, are secured as by welding preferably at acute angles.

Each of the supporting heads 43 is mounted for vertical adjustment on a pedestal 44 which in turn is horizontally adjustable on the work plate 5. The heads 43 and pedestals 44 are formed with interfitting tongue and groove formations, tongues 45 on the heads being received and guided in grooves 46 of the pedestals 44 for vertical sliding movement. At the top of each pedestal an overhanging cap 48, secured to the pedestal as by recessed screws, receives an adjusting rod or bolt 47, the bolt turning freely in the overhanging portion of the cap and having its lower end threaded into matching threads formed in the supporting head 43. Longitudinal movement of the rod or bolt relative to the pedestal 44 is restrained by bolt head 49 and a collar 50 pinned on the bolt against the underside of the overhanging pedestal cap 48. The collar 50 is received in a recess 51 machined out of the upper end of the metal pedestal 44. Turning the rods or bolts 49 operates to raise or lower the supporting heads 43 so as to locate lower curved edge or toe 52 of the pressure bar 40 at the correct height relative to the spline S and the frame member 10 of the particular panel to be assembled. A number of locking cap screws 54 extend through elongated slots 55 in the pedestal 44 and are threaded into the supporting head 43. After the head has been adjusted to the desired height the locking screws 54 are tightened to hold the parts rigidly in adjusted position and prevent relative movement between the heads and the pedestals.

The pedestals 44 are supported directly on the upper surface 6 of the work plate 5, the pedestals each having along opposite sides integral flanges 56 received under overhanging retaining flanges of L-sectioned guides 57 secured to the work plate by screws 58. Movement of the pedestals 44 in the guides 57, the latter being first loosened by backing off the screws 58, is effected by traverse rods or bolts 59 supported to turn freely in metal blocks 60 welded or otherwise secured to the edge of the work plate 5. Endwise movement of the bolts or rods in the supports 60 is restrained by bolt heads 61 and collars 62 disposed on opposite sides of the supports, the collars being pinned to the bolts. After adjustment of the pedestals 44 horizontally by means of threaded traverse rods 59 so as to position the toe 52 of the pressure bar in correct lateral position with respect to the splines and frame members of the particular type of panels being assembled, the parts are locked in place by tightening the screws 58 which clamp the L-sectioned guides 57 against the pedestal flanges 56.

The pressure bar 40 is swung up and down over an arcuate path by rocking or oscillating the shaft or bar 42. Two of the arms 41, disposed intermediate the pedestals 44, are keyed to the shaft as indicated at 64 (Fig. 10). These intermediate arms carry levers 65, the ends of which are bifurcated to receive the eyes 66 of link rods 67. The rod eyes are received on pins 63 in the lever ends. The levers 65 may be integral with the arms 41 or, as shown, may be separately formed and secured to the arms as by screws 68. If desired the arms 41 may be split as indicated at 69 so that the screws 68 serve to clamp the arms on the rod or shaft 42.

The link rods 67 extend downwardly through elongated openings 70 in the plate 5 and the web of channel 4 and at their lower ends are formed with eyes 71 pin connected to the bifurcated or clevis ends 72 of bell crank plates 74. These plates are suspended for swinging movement in vertical planes on pins 75 carried in the bifurcated ends of clevis blocks 76 which extend through openings in the channel 4 and are secured to the underside of the plate 5 by screws 77. The lower ends of the two bell crank levers 74 are received in clevis ends 78 of an equalizer bar or member 79, the bell crank plates being pivotally connected to the equalizer by pins 80. The center of the equalizer 79 is connected by pin 81 in clevis end 82 of piston rod 84 extending from the upper end of a pneumatic piston and cylinder assembly 85.

The other or lower end of the pneumatic assembly is pin connected at 86 to a bracket 87 secured to a cross member 88 supported by auxiliary frame members 89 of the table structure. The supply of air under pressure or other pneumatic fluid to the assembly 85 is controlled by suitable hand or foot valves not shown so that, at will, the operator can either introduce air under pressure into the lower end of the cylinder through conduit 90, exhausting air from above the piston through conduit 91, or, in the alternative, introduce air under pressure into the top of the cylinder above the piston through the conduit 91, exhausting air from the bottom of the cylinder through the conduit 90.

Spline setting movement is imparted to the pressure bar 40 by swinging the latter in a clockwise direction as viewed in Figs. 3, 4, 6 and 10. Reverse or counter-clockwise movement retracts the pressure bar so that the panel frame can be shifted in the apparatus for the next spline setting operation. To limit the downward or clockwise movement of the pressure bar 40 and thereby insure the correct positioning of the splines S in the grooves or channels 14 of the frame members 10, adjusting screws 93 are threaded downwardly through the work plates 5 so as to engage the clevis ends 72 of the bell crank plate 74 as the latter are swung upwardly by the action of the pneumatic assembly 85. Lock nuts 94 are provided on the adjusting screws 93 to retain the latter in the positions to which they are set.

The pressure bar 40 is relieved or notched at intervals along its length. The notches, indicated at 92, are spaced to correspond to the grooves 36 in the table. These pressure bar notches are provided to receive, during the spline setting movement of the pressure bar, those frame members of the panel being splined that extend laterally from the frame member disposed against the stop 25.

In the setting of splines in certain types of panels it may be desirable to clamp each frame member of the panel during the insertion of the spline therein. As an optional accessory to the apparatus of the present invention, and as an optional phase of the present spline setting method, provision is made for the application of clamping pressure to the panel frame member during the spline setting operation. Above the stop 25 and in parallel relation thereto is disposed a clamping member 95 in the form of a steel bar. This member is suspended from arms 96 pivoted on pins 97 supported in clevis ends of blocks 98 secured to the upper face 6 of the work plate 5. At intervals along its length the clamping member 95 is recessed on its underside to receive the upper ends of helical coil compression springs 99 (Fig. 4) which extend into openings 100 in the stop member 25 and work plate 5. The openings in the work plate are threaded to receive adjusting screws 101 which extend upwardly through the bottom of the plate and support the lower ends of the compression springs 99. Locking nuts 102 on the screws 101 retain the latter in adjusted position. The web of the channel 4 is cut away as indicated at 103 to accommodate the screws 101 and the locking nuts 102.

Against one side of the clamping member 95 is disposed a resilient yieldable contact element 105 which may be formed of a suitable rubber composition compounded and vulcanized to correspond to the characteristics of conventional pneumatic vehicle tire rubber. The contact element 105 is secured to the clamping member by screws 106 which extend through a metal retaining strip 107 coextensive in length with the contact element. Desirably a metal backing plate 108 may be disposed across the tops of the contact element 105 and the clamping member 95, being secured to the latter and serving to resist upward shifting movement of the resilient element 105 when such element is forced against the upper side face of one of the panel frame members 10 during the spline setting operation.

Actuation of the clamping assembly in timed relation to and in synchronism with the movement of the pressure bar 40 is effected by a plurality of eccentric collars 110 received on the bar or shaft 42 and secured against relative rotation thereon by set screws 111. Some of the collars 110 are disposed against the adjustable supporting heads 43 and serve to prevent endwise shifting movement of the shaft 42 and the pressure bar 40.

Beneath each of the eccentrics 110 is disposed a bearing stud 112 threaded into the cover plate 108 and clamping member 95 of the clamping assembly. As the shaft 42 is rotated to swing the pressure bar 40 downwardly in a spline setting operation the curved cam surfaces of the eccentrics 110 bear against the heads of the bearing screws 112. The bearing screws 112 are adjusted so that the upper side face of the panel frame member 10 is engaged by the edge of the yielding resilient element 105 prior to contacting of the spline S by the rounded toe 52 of the pressure bar 40. Thus the frame member of the panel is held securely against the upper face 6 of the work plate 5 by the clamping assembly before the application of pressure to the spline by the pressure bar 40 and is held against displacement during the forcing of the spline into the groove 14. Lateral support is also provided for the frame member to resist deformation under stresses imposed thereon during splining.

In performing a spline setting operation the pressure bar 40 is retracted or raised to initial position by the introduction of fluid or air under pressure into the upper end of the pneumatic cylinder assembly 85. The pneumatic assembly draws the bell crank plates 74 downwardly, lowering the link rods 67 and thereby rotating the shaft 42 counter-clockwise substantially to the position illustrated in Fig. 10 in which the pressure bar 40 is elevated above the level of the table top 1 and work plate 5 to permit movement of one of the frame members of the panel to be splined against the edge 27 of the stop 25.

The counter-clockwise rotation of the shaft 42 also moves the eccentrics 110 substantially to the position illustrated in Fig. 5 in which the clamping assembly is raised by the springs 99 to permit the movement of the frame member under the resilient element 105.

Spline S is manually placed along the glass 16 adjacent the opening into the groove 14, substantially in the position illustrated in Fig. 11. Thereafter the shaft 42 is rotated clockwise by the introduction of air or other pneumatic fluid into the lower end of the assembly 85, the previously admitted air exhausting from the upper end of the assembly through the conduit 91. Fluid pressure in the lower end of the pneumatic cylinder assembly 85 forces the piston rod 84 out of the cylinder or to the left as viewed in Figs. 3, 6 and 10, causing the bell crank plates 74 to pivot in a clockwise direction on the pins 75 and raise the links 67 so as to turn the shaft 42 in a clockwise direction by means of the lever arms 65. As the shaft 42 is thus rotated clockwise from the position of Fig. 10 to the position of Figs. 3, 4 and 6, the clamping assembly is first swung downwardly so that the upper surface of the frame member 10 is engaged by the resilient element 105 and held against the work plate 5. Thereafter the curved toe 52 of the pressure bar 40 moves against the long flange 20 of the spline S in an oblique direction and over an arcuate path. This arcuate movement of the curved pressure toe applies a force to the spline which effects a partial collapse of the spline and also forces the spline laterally into the frame groove 14. The pressure bar toe 52 is, of course, discontinuous along the length of the spline S by reason of the lateral notches 92 which extend into the body of the pressure bar through the toe edge thereof. Nevertheless the pressure bar applies pressure to the spline along substantially the entire length of the spline, the discontinuous toe edge of the pressure bar acting like a multiplicity of cooperating fingers.

The limit of movement of the pressure bar 40 in forcing the spline S into the frame panel 14 is determined by the adjusting screws 93 which engage the clevis extensions on the bell crank levers 74 as shown in Fig. 6. By means of the previously described vertical and horizontal adjustments provided for the heads 43 and pedestals 44 the angular path of the pressure bar toe 52 can be varied to suit the particular requirements of the type of spline being used.

After completion of the pressure stroke of the bar 40 the operator releases the pneumatic fluid from the lower end of the cylinder assembly 85 through conduit 90 and introduces high pressure fluid into the upper end of the cylinder through the conduit 91. The retraction of the piston rod 84 into the cylinder assembly lowers the bell crank plates 74 from the full line position shown in Fig. 6 to the broken line position of that figure, thereby turning the shaft 42 in a counter-clockwise direction and raising the pressure bar 40 to the position shown in Fig. 10. This rotation of the shaft 42 turns the cams or eccentrics 110 from the position of Fig. 4 to the position of Fig. 5, allowing the clamping member 95 to be raised by the springs 99 from the clamping position of Fig. 4 to the raised or released position of Figs. 5 and 10.

With the pressure bar 40 and the resilient clamping element 105 in the raised or retracted positions shown in Fig. 10 the operator withdraws the splined frame member from its position against the stop 25 and rotates or moves the frame so that the next frame member thereof is located against the stop in position to receive a spline. In this positioning of the frame for the succeeding splining operation, the end of the frame is disposed against the lateral or adjustable stop 30 so as to locate the frame in such position that the offset flange 24 of the splined frame member is disposed in one of the table top slots 35 or 36. A spline is then positioned on the glass 16 adjacent the groove 14 of the frame member 10 to be splined and the shaft 42 is again rotated in the manner previously described to lower the resilient clamping member 105 and to force the spline into the frame groove by means of the pressure bar 40 in the manner previously described. The operation is performed sequentially on each of the frame members, completing the splining.

The present machine provides a splining aid for use in large scale production. A number of window frames can be assembled or prepared with the glass panels or panes 16 by one operator. These assembled frames are stacked horizontally one on top of another and supplied in quantity to the operator of the splining machine described above. The machine operator transfers the frame panels one at a time to the horizontal surface 7 of the table top 1 and there places the splines S one at a time in each of the four sides of the individual panel frames. Thus the machine operator specializes in the spline placing function and even relatively untrained individuals soon become adept and efficient in this operation.

In accordance with the patent statutes the principles of the present invention may be utilized in various ways, numerous modifications and alterations being contemplated, substitution of parts and changes in construction being resorted to as desired, it being understood that the article and apparatus shown in the drawings and described above and the particular method set forth are given merely for purposes of explanation and illustration without intending to limit the scope of the claims to the specific details disclosed.

What we claim and desire to secure by Letters Patent of the United States is:

1. Apparatus for inserting splines in the grooved frame members of window panels and the like comprising a panel supporting table, a longitudinal stop on said table for locating said frame members, lateral supporting arms pivoted approximately over and above said table and parallel to the longitudinal stop on said panel supporting table, an elongated pressure member mounted on said supporting arms for engaging said splines, means for actuating said pressure member, and means for clamping said frame members against said table, said clamping means being coordinated with the pressure member so as to clamp a frame member prior to engagement of a spline by the pressure member.

2. Apparatus as defined in claim 1 wherein said clamping means comprises a clamping member and a yieldable rubber contact element secured to the clamping member for engaging said frame members.

3. Apparatus for inserting a spline in the grooved frame member of a window panel and the like comprising a panel supporting table having a longitudinal stop thereon for locating said frame members, a lateral supporting arm pivoted approximately over and above said table and parallel to the longitudinal stop on said panel supporting table, an elongated pressure member for engaging said spline, said pressure member being mounted on said supporting arm at an acute angle thereto, means for actuating said pressure member, and means for engaging said frame member and clamping it against said table, said last-named means including a yieldable clamping member and being coordinated with said pressure member so as to clamp said frame member prior to engagement of the spline by said pressure member.

4. Apparatus for inserting a spline in the grooved frame member of a window panel and the like comprising a panel supporting table, a longitudinal stop on said table for locating said frame member, lateral supporting arms pivoted about an axis approximately over and above said table and parallel to the longitudinal stop on said table, an elongated pressure member carried by said supporting arms at an acute angle thereto for movement in unison therewith, said pressure member having an elongated spline engaging edge substantially parallel to the pivot axis, actuating means connected to said supporting arms for turning the latter to swing the pressure member toward the table in a spline setting movement in which said spline engaging edge moves laterally over an arcuate path while remaining substantially parallel to said axis, the pressure member being so rounded that said path is at an acute angle to the surface of said table whereby during said setting movement the pressure member applies to said spline a force having one component thereof in a direction toward said spline and normal to the table surface and another component thereof in a direction toward said longitudinal stop and parallel to the table surface, and clamping means including a yieldable rubber contact element operatively connected to said pressure member for holding said frame member in position adjacent said stop during engagement of the spline by said pressure member.

References Cited in the file of this patent

UNITED STATES PATENTS

| Number | Name | Date |
|---|---|---|
| 448,706 | Beisheim | Mar. 24, 1891 |
| 529,697 | Bond | Nov. 27, 1894 |
| 619,869 | Cronin | Feb. 21, 1899 |
| 764,117 | Dolge | July 5, 1904 |
| 1,243,728 | Gagnon | Oct. 23, 1917 |
| 1,720,133 | Le Roy | July 9, 1929 |
| 1,743,319 | Cave et al. | Jan. 14, 1930 |
| 1,773,818 | Ledwinka | Aug. 26, 1930 |
| 1,784,034 | Vitte | Dec. 9, 1930 |
| 1,839,429 | Weaver | Jan. 5, 1932 |
| 1,859,633 | Rhinevault | May 24, 1932 |
| 1,863,897 | Cloppert | June 21, 1932 |
| 1,944,251 | Mansbendel | Jan. 23, 1934 |
| 2,010,674 | Lang | Aug. 6, 1935 |
| 2,042,835 | Fox | June 2, 1936 |
| 2,302,758 | Garbe | Nov. 24, 1942 |
| 2,358,142 | Carlin | Sept. 12, 1944 |
| 2,363,383 | Bertoldo | Nov. 21, 1944 |
| 2,436,278 | Willett | Feb. 17, 1948 |